May 4, 1937.  E. VADASZ  2,079,054
DOOR BRAKE
Filed Jan. 21, 1937  2 Sheets-Sheet 1
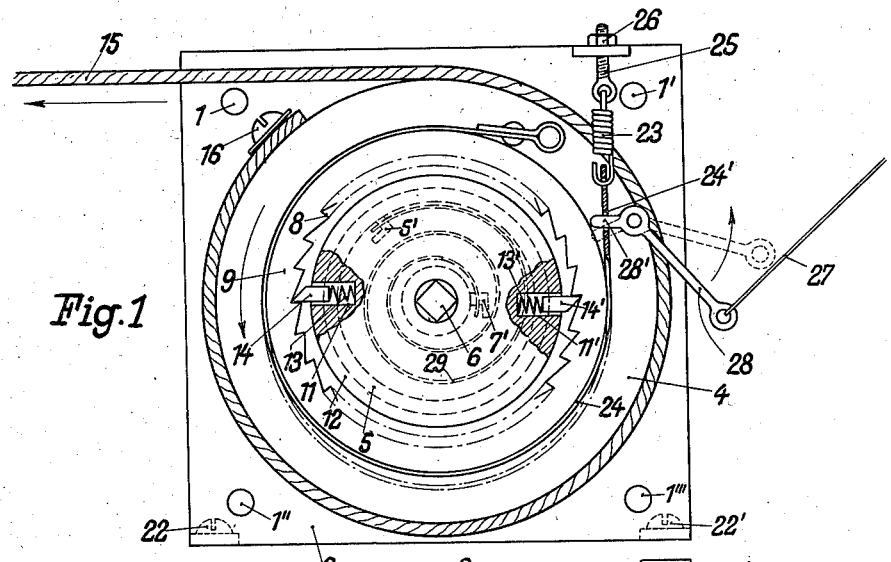
Fig.1
Fig.2
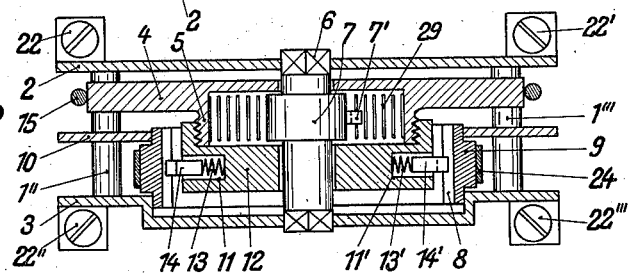
Fig.3
Inventor:
E. Vadasz
By: Glascock Downing & Seebold
Attys.

May 4, 1937.  E. VADASZ  2,079,054

DOOR BRAKE

Filed Jan. 21, 1937  2 Sheets-Sheet 2

Inventor.
E. Vadasz
By: Glascock Downing & Seebold
Attys.

Patented May 4, 1937

2,079,054

UNITED STATES PATENT OFFICE 2,079,054

DOOR BRAKE

Etienne Vadasz, Sainte-Croix, Switzerland

Application January 21, 1937, Serial No. 121,695
In Germany September 7, 1934

13 Claims. (Cl. 188—81)

It is known, that outwardly opening doors of vehicles and particularly of automobiles and railway carriages involve great dangers, when they are opened carelessly, prematurely or by some unforeseen influence.

Grave accidents have frequently been caused by such doors being uncautiously suddenly opened from the side of a stopping vehicle facing the street without the person in question having convinced himself whether other vehicles or pedestrians are approaching or not.

It also frequently occurs, when the handle of a door is depressed, before the car has stopped totally, that the door swings out with great vis viva.

The object of the present invention is to prevent this violent dashing out of the door. According to the invention a braking or damping device is arranged between the leaf and the frame of the door, which braking device is held in braking position when the door is opened and is held in inactive position when the door is closed. Simultaneously means are provided which renders it possible by certain manipulations to totally or partially remove the brake action when the door is opened.

The braking device can be arranged on the leaf or the frame, and in both cases the braking of the movement of the door may be effected by means of air, liquids, electrically, mechanical devices, friction or springs.

The brake may be rendered inactive during the movements of the door by means of the usual door handle or by means of suitably arranged levers, a push button, a slide or the like.

Two embodiments of the invention are illustrated by way of example in the accompanying drawings; in which Fig. 1 is a vertical section and Fig. 2 a horizontal section through a friction brake.

Fig. 3 shows the same device arranged in a door leaf in open position.

Figure 4:
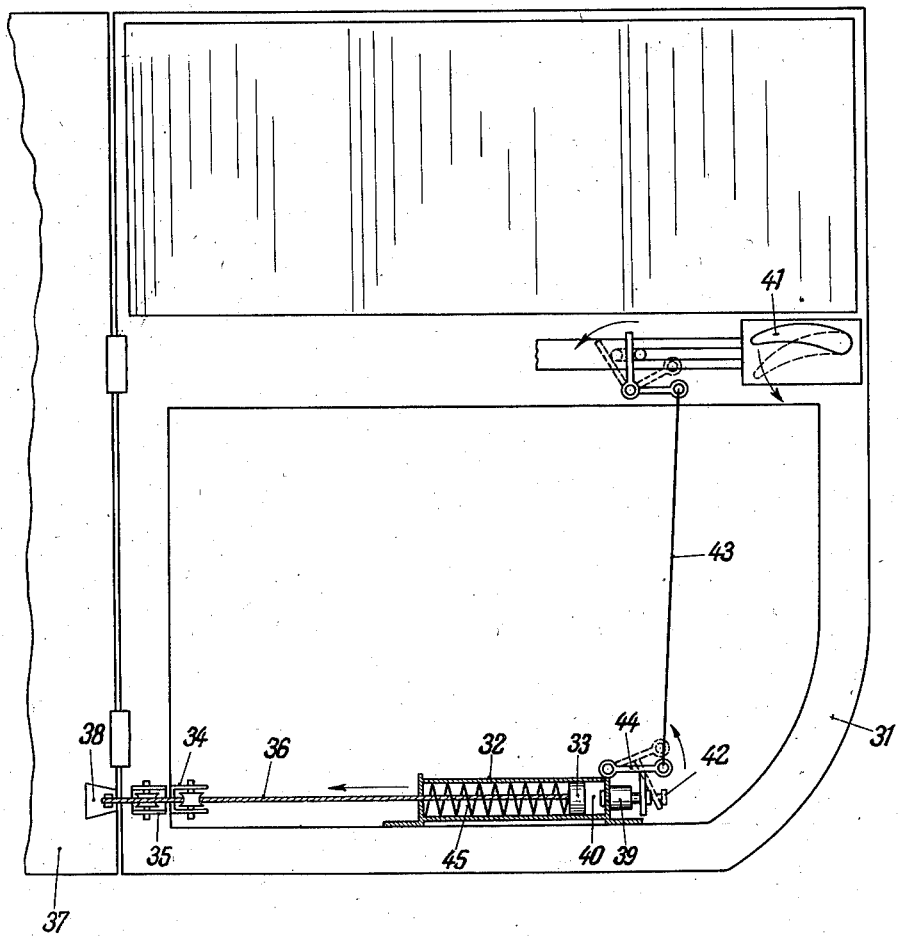
Fig. 4 is an elevational view, showing a vacuum brake arranged in a door leaf.

2 and 3 denote casing plates, which are connected by means of bolts 1 to 1'''. Between these plates a spring casing 5, which is formed integrally with a cord or wire pulley 4, is rotatably arranged on a shaft 7, the parts 6 of which are of quadrangular cross-section, whereby the shaft is prevented from rotating.

The brake drum 9, which is equipped with internal ratchet teeth 8, is by means of an intermediate plate 10 arranged for rotation concentrically to the shaft 7.

In the bores 11—11' of the cover 12 of the spring casing 5, which cover is screwed to the casing, radially displaceable latches 14—14' are arranged, which are under the influence of springs 13 and 13' respectively.

According to Fig. 1 one end of the wire 15 is by means of a screw 16 fixed to the pulley 4. The wire is passed between rollers 18, 19 arranged in the door 17, and the other end of it is fixed to the door frame 20 by means of the member 21.

The braking device is fixed to the door 17 by means of screws 22—22''', and when the door is opened it will therefore carry the braking device along with it, whereby the cord 15 between the point 16 and the member 21 is put under tension and is drawn off the cord pulley in the direction of the arrow. The cord pulley is forced to partake in this movement, and since the spring casing 5 is formed integral with the pulley 4 the cover 12 of the casing 5 will rotate correspondingly, whereby the brake drum 9, through the cooperation between the internal toothing 8, the pawls 14—14' in the cover 12 and the springs 13—13', is forced to rotate in the same direction.

In order to reduce the speed of rotation of the pulley 4 and thereby also to dampen the opening movement of the door 17 a brake band 24 is laid on the drum 9. One end of the band 24 is attached to a draw spring 23, and the braking action, i. e. the force with which the brake band is pressed against the brake drum, can be regulated as desired by adjusting the tension of the spring 23 by means of the set screw 25 and the nut 26.

In order to render it possible to remove the braking action when the door is opened, the door handle (not shown) is by means of a cord 27 connected with a double-armed lever 28—28' in such a manner, that when the door handle is moved the lever 28—28' is turned into the position indicated in dashed lines.

The arm 28' of the said lever is so connected with the end 24' of the brake band, that when the lever is turned on its pivot in the direction of the arrow, the engagement between the brake drum and the brake band 24 is positively loosened, so that the latter will take up the position shown in dot-and-dash-lines. When the door handle is released, the spring 23 will again tighten the brake band and the lever 28—28' will swing back into its original position.

Due to the pull on the cord 15 caused by the opening of the door 17, a clock-spring 29, the ends of which are attached to a hook 5' on the spring casing 5 and a hook 7' on the shaft 7, respectively, is tensioned to such a degree, that when the door 17 again is closed the cord pulley 4 together with the spring casing 5 and the draw cord 15 are brought back into their original positions by the contracting spring, whereby the pawls 14—14', due to the suitable form of their outer ends and the resiliency of the springs 13—13', will slide smoothly back over the internal toothing 8 of the brake drum 9.

It is of course possible to adjust the connection between the door handle and the release device in such a manner, that when the door handle is only partially depressed, the braking action is not or only partially removed, and when the depression of the handle is continued, the braking effect is totally removed.

Since the brake band 24 is yieldingly supported by the spring 23, the braking action can be adjusted by means of screw and nut 25, 26 as to practically block the opening of the door by rendering the braking friction too great to be overcome by ordinary effort. On the other hand the braking action can be adjusted in such a manner, that when the door 17 is opened, a yielding, non-blocking brake action is created, whereby the door can be opened conveniently without the use of a release device.

Under maintenance of the fundamental characteristic features of the invention, according to which a braking takes place only when the door is opened and may be interrupted at any desired moment by the actuation of a release device, the described cylindrical brake drum or brake band may be replaced by other well known means.

The brake action is constant and is per se strong enough to prevent the door being opened too wide and with vis viva. For additional security however, according to the invention the draw cord 15 carries a stop member 30 (Fig. 3), which renders the bands superfluous which usually are employed for limiting the movements of the door. When the door is swung open beyond the admissible degree, the stop 30 will abut against a sleeve 18' surrounding the roller 18, whereby further movement of the door is prevented. Instead of the stop 30 fixed to the cord 15 other stopping devices may be used.

According to Fig. 4 the brake cylinder 32 is rigidly connected with the outwardly opening door 31 and moves with the same.

The piston 33 in the cylinder 32 is connected to the door frame 37 by means of a draw cord or wire 36, which passes over sliding rollers supported in brackets 34, 35 and is fixed to a member 38 located in the door frame.

When the door is opened the piston 33 is moved outward in the direction of the arrow whereby in the cylinder 39 a reduced pressure is created in the space 40 closed by the valve 39. This partial vacuum in the space 40 will hinder the movement of the piston 33, whereby the opening movement of the door is damped.

When the door handle 41 is depressed the valve stem 42 is by means of the cord 43 and the lever 44 forced outward, whereby the valve 39 is opened and air will flow into the space 40 and reestablish the atmospheric pressure in the same, so that the door can be opened without difficulty.

When the door 31 is closed, the pressure spring 45 will return the piston to its original position, whereby the air sucked in during opening movement again is forced out through the open valve 39.

Obviously any well known form of valve might replace the mechanical valves shown.

I claim:—

1. In a door brake, particularly for motor vehicles, railway carriages and the like, in combination, means for creating and maintaining a braking action during the opening movement of the door, other means for removing the braking action during the opening movement, and a transmission member between a relatively stationary part of the vehicle and the braking device adapted to transmit the movements of the door to the braking device.

2. In a door brake, particularly for motor vehicles, railway carriages and the like, in combination, means for creating and maintaining a braking action during the opening movement of the door, actuating means for influencing the braking action during the opening movement of the door, and transmission members operable from the door for rendering said actuating means operative.

3. In a door brake, particularly for motor vehicles, railway carriages and the like, in combination, means for creating and maintaining a braking action during the opening movement of the door, a door handle, actuating means for influencing the braking action during the opening movement of the door, and transmission members operable by means of the door handle for rendering said actuating means operative.

4. In a door braking device, particularly for motor vehicles, railway carriages and the like, in combination, a friction brake being adapted to become automatically operative when the door is opened and to automatically become inoperative when the door is closed, and means for influencing the action of said friction brake at will.

5. In a door braking device, particularly for motor vehicles, railway carriages and the like, in combination, a friction brake being adapted to become automatically operative when the door is opened and to automatically become inoperative when the door is closed, said friction brake comprising a brake drum, a brake band, a free wheel mechanism adapted to be coupled to the brake drum when being rotated in one direction and to rotate freely when being rotated in the other direction, a pulley, connected to said free wheel mechanism, a transmission member connected with one end to the pulley and being fixed with the other end to another part of the vehicle casing than that in which the other parts of the friction brake are located and being adapted to be tightened and to actuate the brake when the door is opened, and means for influencing the action of the brake at will.

6. In a door braking device, particularly for motor vehicles, railway carriages and the like, in combination, a friction brake being adapted to become automatically operative when the door is opened and to automatically become inoperative when the door is closed, a brake drum, a brake band fixed with one end adjacent the brake drum and being resiliently and adjustably fixed with the other end to a relatively stationary part, and means for influencing the action of the brake at will.

7. In a door braking device, particularly for motor vehicles, railway carriages and the like, in combination, a friction brake being adapted to become automatically operative when the door is opened and to automatically become inoperative when the door is closed, said brake comprising a brake drum, a brake band fixed with one end adjacent the brake drum and being resiliently and adjustably fixed with the other end to a relatively stationary part, and means adapted to influence the action of the brake by altering the frictional pressure between the brake band and the brake drum.

8. In a door braking device, particularly for motor vehicles, railway carriages and the like, in combination, a vacuum brake being adapted to become automatically operative when the door is opened and to become automatically inoperative when the door is closed, said brake comprising a vacuum cylinder, a piston in the same, means for automatically creating a reduced pressure within the cylinder when the door is opened and other means for again establishing atmospheric pressure in the cylinder at any desired movement.

9. In a door brake, particularly for motor vehicles, railway carriages and the like, in combination, means for creating and maintaining a braking action during the opening movement of the door, other means for influencing the braking action during the opening of the door, and still other means for returning the parts of the brake to their original positions when the door is closed.

10. In a door brake, particularly for motor vehicles, railway carriages and the like, in combination, means including a friction brake for creating and maintaining a braking action during the opening of the door, other means for influencing the braking action during the opening of the door, and a spring arranged within the friction brake and being adapted to return the parts of the brake with accessories to their original positions when the door is closed.

11. In a door brake, particularly for motor vehicles, railway carriages and the like, in combination, means including a vacuum brake for creating and maintaining a braking action during the opening of the door, other means for influencing the braking action during the opening of the door, and a spring arranged within the vacuum brake and being adapted to return the parts of the brake with accessories to their original positions when the door is closed.

12. In a door brake, particularly for motor vehicles, railway carriages and the like, in combination, means for creating and maintaining a braking action during the opening movement of the door, other means for influencing the braking action during the opening of the door, and adjustable stopping means for limiting the outward movement of the door.

13. In a door brake, particularly for motor vehicles, railway carriages and the like, in combination, means for creating and maintaining a braking action during the opening movement of the door, other means for influencing the braking action during the opening of the door, and adjustable stopping means for stopping the outward movement of the door when the same has moved through a predetermined angle.

ETIENNE VADASZ.